United States Patent
Mochizuki

(10) Patent No.: US 9,154,659 B2
(45) Date of Patent: Oct. 6, 2015

(54) IMAGE FORMING APPARATUS

(71) Applicant: KYOCERA DOCUMENT SOLUTIONS INC., Osaka (JP)

(72) Inventor: Masayuki Mochizuki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 9 days.

(21) Appl. No.: 14/011,619

(22) Filed: Aug. 27, 2013

(65) Prior Publication Data

US 2014/0063524 A1 Mar. 6, 2014

(30) Foreign Application Priority Data

Aug. 30, 2012 (JP) ................. 2012-189480

(51) Int. Cl.
*H04N 1/00* (2006.01)
*G03G 15/00* (2006.01)

(52) U.S. Cl.
CPC ....... *H04N 1/00896* (2013.01); *G03G 15/5004* (2013.01)

(58) Field of Classification Search
None
See application file for complete search history.

(56) References Cited

U.S. PATENT DOCUMENTS

| | | | |
|---|---|---|---|
| 5,903,767 A * | 5/1999 | Little | 713/323 |
| 5,925,132 A * | 7/1999 | Kadokura | 713/323 |
| 5,939,998 A * | 8/1999 | Caporuscio et al. | 340/3.4 |
| 6,601,178 B1 * | 7/2003 | Gulick | 713/322 |
| 6,926,380 B2 | 8/2005 | Narazaki et al. | |
| 7,982,889 B2 * | 7/2011 | Okada | 358/1.14 |
| 8,027,046 B2 * | 9/2011 | Yamasaki | 358/1.14 |
| 8,032,774 B2 | 10/2011 | Yano et al. | |
| 8,400,659 B2 | 3/2013 | Sasaki | |
| 2002/0015172 A1 * | 2/2002 | Sugita | 358/1.13 |
| 2002/0118235 A1 * | 8/2002 | Narazaki et al. | 347/5 |
| 2003/0159076 A1 * | 8/2003 | Delisle et al. | 713/300 |
| 2004/0044493 A1 * | 3/2004 | Coulthard | 702/122 |
| 2007/0150214 A1 * | 6/2007 | Qin et al. | 702/60 |
| 2007/0182998 A1 * | 8/2007 | Okada | 358/400 |
| 2007/0236734 A1 * | 10/2007 | Okamoto | 358/1.16 |
| 2007/0260358 A1 * | 11/2007 | Katoh | 700/286 |
| 2008/0019709 A1 * | 1/2008 | Eom | 399/9 |
| 2008/0118266 A1 * | 5/2008 | Nakayama et al. | 399/70 |
| 2008/0231878 A1 * | 9/2008 | Yano et al. | 358/1.13 |

(Continued)

FOREIGN PATENT DOCUMENTS

| | | |
|---|---|---|
| JP | 2002-052784 A | 2/2002 |
| JP | 2002-254621 A | 9/2002 |

(Continued)

OTHER PUBLICATIONS

An Office Action; "Notice of Reason for Rejection," issued by the Japanese Patent Office on Jul. 22, 2014, which corresponds to Japanese Patent Application No. 2012-189480 and is related to U.S. Appl. No. 14/011,619.

*Primary Examiner* — Ted Barnes

(74) *Attorney, Agent, or Firm* — Studebaker & Brackett PC

(57) ABSTRACT

In an image forming apparatus, in order to make an engine CPU perform first processing after output of a return request, a main CPU sets a level of a signal line, through which the return request is output, at a first level. In order to make the engine CPU perform second processing, the main CPU sets the level of the signal line at a second level. The engine CPU determines on the basis of the level of the signal line after the output of the return request which processing is to perform, the first processing or the second processing.

9 Claims, 6 Drawing Sheets

(56) References Cited

U.S. PATENT DOCUMENTS

| | | | | |
|---|---|---|---|---|
| 2009/0240966 A1* | 9/2009 | Katoh | ............................ | 713/323 |
| 2009/0296163 A1* | 12/2009 | Koura | ............................ | 358/403 |
| 2010/0067043 A1* | 3/2010 | Sasaki | ............................ | 358/1.15 |
| 2010/0165395 A1* | 7/2010 | Yamauchi | ..................... | 358/1.15 |
| 2010/0188685 A1* | 7/2010 | Furukawa | ..................... | 358/1.14 |
| 2011/0194133 A1* | 8/2011 | Fujisawa | ...................... | 358/1.13 |
| 2011/0235083 A1* | 9/2011 | Suzuki | ............................ | 358/1.14 |
| 2012/0049832 A1* | 3/2012 | Shinyama | ..................... | 323/299 |
| 2012/0194580 A1* | 8/2012 | Sasaki | ................................ | 347/5 |

FOREIGN PATENT DOCUMENTS

| | | |
|---|---|---|
| JP | 2008-229990 A | 10/2008 |
| JP | 2010-072257 A | 4/2010 |

* cited by examiner

IMAGE FORMING APPARATUS

INCORPORATION BY REFERENCE

The present application claims priority under 35 U.S.C. §119 to Japanese Patent Application No. 2012-189480, filed Aug. 30, 2012. The contents of this application are incorporated herein by reference in their entirety.

BACKGROUND

The present disclosure relates to image forming apparatuses having a normal mode and a power save mode.

Recently, in response to increasing demands for power saving, various types of image forming apparatuses having a power save mode to reduce power consumption have been proposed.

Some type of image forming apparatus includes a master controller that controls the entire apparatus and a slave controller that controls a printing section (mechanism that executes a print job) upon receipt of an instruction from the master controller.

In order for the image forming apparatus with this configuration to return from the power save mode to the normal mode, a return request is output from the master controller to the salve controller, for example. As one example, when the image forming apparatus receives a print request from a user terminal, the master controller outputs the return request to the slave controller. Also, when the state of the apparatus (e.g., a paper accommodation state) changes, the master controller outputs the return request to the slave controller. It is noted that some type of image forming apparatus suspends communication functions (functions to communicate information on a print job, information on an apparatus state, etc.) of the master controller and the slave controller in the power save mode. Accordingly, in such an image forming apparatus, the master controller and the slave controller are connected together through, for example, a signal line (hereinafter referred to as a first signal line for the convenience sake) to output the return request from the master controller to the slave controller.

For example, when the master controller outputs to the slave controller a return request in response to a print request received from a user terminal, the slave controller allows the printing section to perform a warm-up operation necessary for execution of the print job in a return. Further, when the master controller outputs to the slave controller a return request in response to change in apparatus state (where operation of the printing section is unnecessary), the slave controller notifies the master controller of information indicating the apparatus state in the return. However, in order to save on wasteful power consumption, the slave controller allows the printing section not to perform the warm-up operation.

As described above, various processing must be performed in a return from the power save mode to the normal mode (e.g., processing to allow the printing section to perform the warm-up operation, processing to allow the printing section not to perform the warm-up operation, etc.). However, the slave controller cannot recognize processing to be performed in a return only with the return request from the master controller. For this reason, after outputting the return request to the slave controller, the master controller is required to wait until the communication functions suspended in the power save mode become operable and then provide to the slave controller an instruction on processing to be performed in a return. However, in this case, only after the communication functions suspended in the power save mode become operable, the processing to be performed in the return from the power save mode to the normal mode is determined. As a result, the processing to be performed in the return starts with delay.

In order to solve the aforementioned problem, in some cases, a signal line (hereinafter referred to as a second signal line for the convenience sake) may be provided besides the first signal line for output of the return request from the master controller to the slave controller. The master controller outputs an instruction on processing to be performed in a return to the slave controller through the second signal line. With this configuration, the master controller can output to the slave controller an instruction on processing to be performed in a return without the need to wait until the communication functions suspended in the power save mode become operable.

SUMMARY

An image forming apparatus according to the present disclosure has a normal mode and a power save mode in which power consumption is reduced more than in the normal mode. The image forming apparatus according to the present disclosure includes: a slave controller configured to perform first processing or second processing different from the first processing in a return from the power save mode to the normal mode; and a master controller configured to return the slave controller from the power save mode to the normal mode. The master controller is connected to the slave controller through a signal line and outputs to the slave controller a return request from the power save mode to the normal mode in a manner to change a level of the signal line. In order to make the slave controller perform the first processing after output of the return request, the master controller sets the level of the signal line at a predetermined first level. In order to make the slave controller perform the second processing after the output of the return request, the master controller sets the level of the signal line at a predetermined second level. The slave controller determines, on the basis of the level of the signal line after the output of the return request, which processing is to perform, the first processing or the second processing.

DETAILED DESCRIPTION

An image forming apparatus (multifunction peripheral) capable of executing a plurality of jobs, such as a print job, a scan job, etc. will be described below as one example of an image forming apparatus according to one embodiment of the present disclosure.

(Entire Configuration of Image Forming Apparatus)

Figure 1:
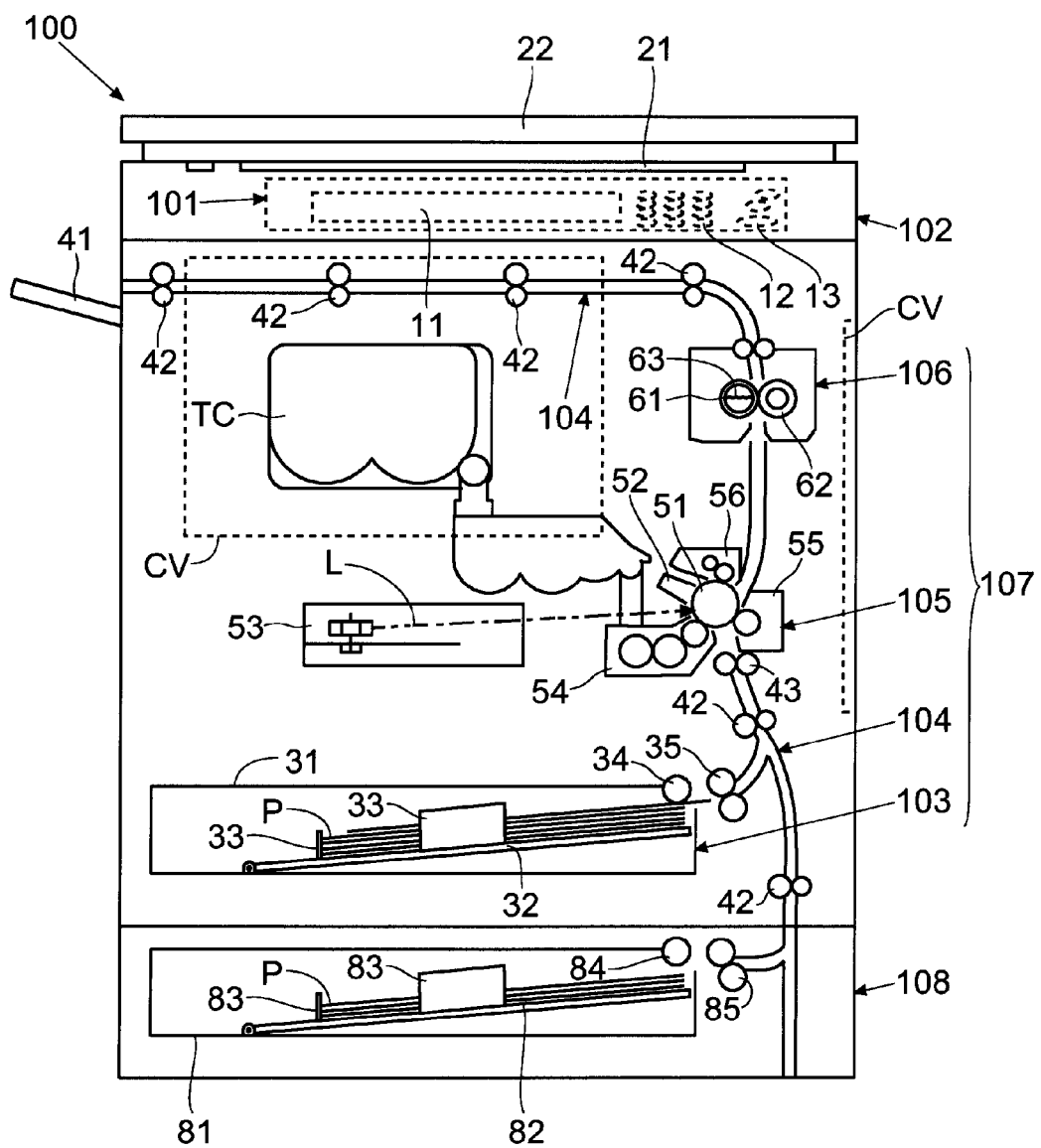
FIG. 1 is a schematic diagram of an image forming apparatus according to one embodiment of the present disclosure.

FIG. 1 is a schematic diagram of an image forming apparatus 100 according to one embodiment of the present disclosure. As shown in FIG. 1, the image forming apparatus 100 according to the present embodiment includes an operation panel 101, an image reading section 102, a main body paper feeder 103, a paper conveyance section 104, an image forming section 105, and a fixing section 106. Among them, the main body paper feeder 103, the paper conveyance section 104, the image forming section 105, and the fixing section 106 are mechanisms necessary for execution of a print job and are hereinafter referred collectively to as an engine section 107. It is noted that the engine section 107 corresponds to a printing section in the present disclosure.

The operation panel 101 includes a liquid crystal display 11 having a display surface covered with a touch panel. The liquid crystal display 11 displays soft keys and a menu to receive various settings. The operation panel 101 also includes a numeric keypad 12 to receive numerical entry, hardware keys, such as a start key 13 to receive an instruction to execute a job, etc.

The image reading section 102 scans an original document and generates image data of an image to be formed. The image reading section 102 includes, though not shown, optical members, such as an exposure lamp, a mirror, a lens, an image sensor, etc. The image reading section 102 irradiates light to an original document placed on a contact glass 21 and performs A/D conversion on an output value of the image sensor that receives reflected light from the original document, thereby generating image data. Thus, printing can be performed on the basis of the image data obtained by scanning. Further, the image data obtained by scanning can be stored. It is noted that the image reading section 102 may include an original cover 22 to hold an original document placed on the contact glass 21.

The main body paper feeder 103 includes a cassette 31 that accommodates paper P. The cassette 31 is capable of being drawn from and accommodated in the main body of the apparatus. For example, in replenishing the cassette 31 with the paper P, the cassette 31 is pulled out from the apparatus main body. After replenishment of the cassette 31 with the paper P, the cassette 31 is accommodated in the apparatus main body. Further, the cassette 31 is pulled out from the apparatus main body in a jam and the like.

The paper P in the cassette 31 is placed on a mounting plate 32. The mounting plate 32 is turnable about its one end as a pivot axis to change the inclination of the cassette 31 according to the amount of the accommodated paper P. That is, when the cassette 31 is replenished with the paper P so that the number of pieces of the paper P placed on the mounting plate 32 is increased, the other end (opposite end to the pivot axis) of the mounting plate 32 turns downward. By contrast, when the paper P in the cassette 31 is consumed, thereby decreasing the number of pieces of the paper P placed on the mounting plate 32, the other end of the mounting plate 32 turns upward.

A restriction guide 33, which is set to be in contact with the side surface of the paper P in the cassette 31, is mounted on the mounting plate 32. The restriction guide 33 is slidable in a direction in which the paper P is fed or a direction orthogonal to the direction in which the paper P is fed. Accordingly, when the restriction guide 33 slides in the slidable direction (direction in which the paper P is fed or direction orthogonal to the direction in which the paper P is fed), the size of the paper P that the cassette 31 can accommodate can be changed. That is, the size of the paper P that the cassette 31 can accommodate is determined according to the position of the restriction guide 33 in the slidable direction.

When a print job starts, the main body paper feeder 103 feeds the paper P in the cassette 31 to a paper conveyance path of the paper conveyance section 104. In order to feed the paper P in the cassette 31 on a sheet-by-sheet basis to the paper conveyance path, the main body paper feeder 103 is provided with a pickup roller 34 to pick up the paper P in the cassette 31 and a separation roller pair to prevent sheet overlap of the paper P in sending.

The paper conveyance section 104 conveys the paper P along the paper conveyance path (toward an exit tray 41). The paper conveyance section 104 includes a plurality of conveyance roller pairs 42 rotatably arranged in the paper conveyance path. Further, the paper conveyance section 104 includes a registration roller pair 43 arranged on the upstream side in the paper conveyance direction of the image forming section 105 (immediately before the image forming section 105). The registration roller pair 43 keeps the paper P waiting immediately before the image forming section 105 and sends the paper P toward the image forming section 105 with appropriate timing.

The image forming section 105 forms a toner image on the basis of image data of an image to be formed, and transfers the toner image to the paper P. The image forming section 105 includes a photosensitive drum 51, an electrostatic charger 52, an exposure device 53, a development device 54, a transfer roller 55, and a cleaning device 56.

The photosensitive drum 51 is driven to rotate first in image formation. The electrostatic charger 52 charges the surface of the photosensitive drum 51 at a predetermined potential. Further, the exposure device 53 outputs a light beam L on the basis of the image data of the image to be formed to scan and expose the surface of the photosensitive drum 51. Thus, an electrostatic latent image is formed on the surface of the photosensitive drum 51. The development device 54 receives toner from a tonner container TC and supplies the toner to the electrostatic latent image formed on the surface of the photosensitive drum 51 for development.

The transfer roller 55 is rotatable upon press contact with the surface of the photosensitive drum 51. The registration roller pair 43 allows the paper P to enter between the transfer roller 55 and the photosensitive drum 51 with appropriate timing. At this time, transfer voltage is applied to the transfer roller 55. Thus, the toner image on the surface of the photosensitive drum 51 is transferred to the paper P. Thereafter, the cleaning device 56 removes toner remaining on the surface of the photosensitive drum 51.

The fixing section 106 applies heat and pressure to the toner image transferred to the paper P for fixing. The fixing section 106 includes a heating roller 61 and a pressure roller 62. The heating roller 61 includes a heater 63 in its interior. The pressure roller 62 is in press contact with the heating roller 61. The paper P to which the toner image is transferred passes between the heating roller 61 and the pressure roller 62 to be heated and pressurized. Thus, the toner image is fixed to the paper P. Printing is accomplished. Thereafter, the printed paper P is sent to the exit tray 41 by the conveyance roller pairs 42.

Moreover, an apparatus cover CV is provided in the image forming apparatus 100 so as to be openable/closable. For example, in the case where the apparatus cover CV is provided in the front of the apparatus, when the apparatus cover CV is opened, part where the tonner container TC is fitted and its vicinity are exposed to enable exchange of the tonner container TC, or jam clearance. Alternatively, in the case where the apparatus cover CV is provided on the side surface of the apparatus, when the apparatus cover CV is opened, part of the engine section 107 is exposed to enable various types of maintenance. It is noted that the number of apparatus covers CV and the location thereof are not limited specifically.

Furthermore, the image forming apparatus 100 in the present embodiment includes a paper feeder 108 to feed the paper P to the engine section 107 besides the main body paper feeder 103. For example, the paper feeder 108 is an optional device attachable to and detachable from the image forming apparatus 100. It is noted that paper feeder 108 may be one mounted on the image forming apparatus 100 after shipment or one mounted on the image forming apparatus 100 in advance at shipment.

The paper feeder 108 is arranged below the engine section 107 (main body paper feeder 103). The paper feeder 108 has the same structure as the main body paper feeder 103 and includes a cassette 81, a mounting plate 82, a restriction guide 83, a pickup roller 84, and a separation roller pair 85.

(Hardware Configuration of Image Forming Apparatus)

Figure 2:
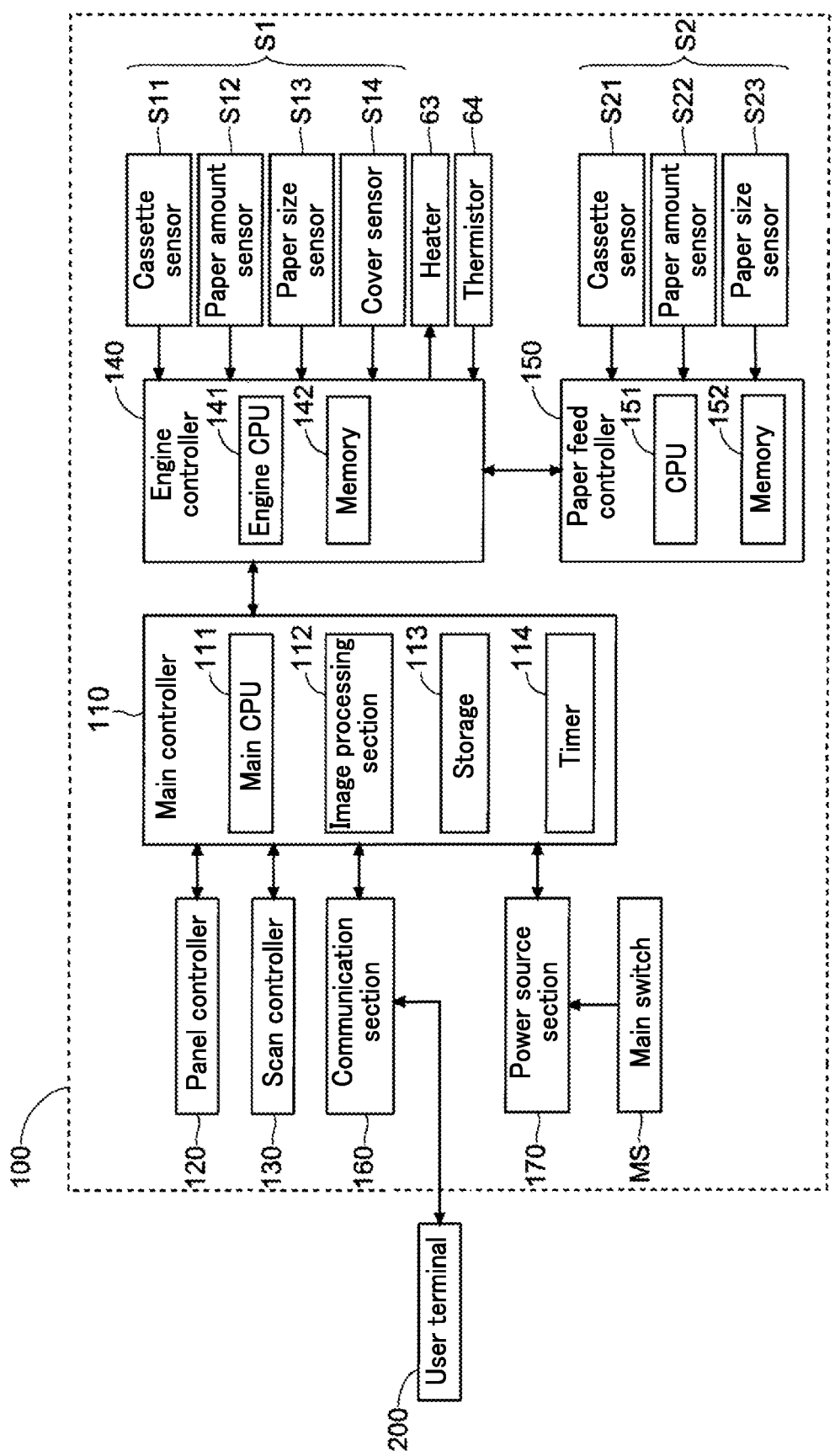
FIG. 2 is a block diagram for explaining a hardware configuration of the image forming apparatus shown in FIG. 1.

FIG. 2 is a block diagram for explaining a hardware configuration of the image forming apparatus 100 shown in FIG. 1. As shown in FIG. 2, the image forming apparatus 100 includes a main controller 110 to control the entire apparatus. The main controller 110 includes a main CPU 111 (corresponding to a master controller in the present disclosure), an image processing section 112, a storage 113, and a timer 114. The image processing section 112 is composed of an ASIC dedicated to image processing and the like to perform various image processing (expansion/contraction, density change, data format conversion, etc.) on image data. The storage 113 includes a ROM and a RAM. For example, the ROM stores programs and data necessary for job execution. The programs and data in the ROM are loaded on the RAM. The timer 114 clocks various times.

Moreover, the main controller 110 is connected to a panel controller 120 and a scan controller 130. The panel controller 120 includes a CPU and a memory (not shown). The panel controller 120 receives an instruction from the main controller 110 to control a display operation of the operation panel 101. The scan controller 130 includes a CPU and a memory (not shown). The scan controller 130 receives an instruction from the main controller 110 to control a scanning operation of the image reading section 102.

Yet further, the main controller 110 is connected to an engine controller 140. The engine controller 140 includes an engine CUP 141 (corresponding to a slave controller in the present disclosure) and a memory 142. It is noted that the memory 142 stores information necessary for a warm-up operation, which will be described later. The engine controller 140 receives an instruction from the main controller 110 to control an image forming operation of the engine section 107. For example, the engine controller 140 controls to drive motors (not shown) to rotate various rotary members. In addition, the engine controller 140 controls on/off of the heater 63 on the basis of output from a thermistor 64 that detects each surface temperature of the heating roller 61 and the pressure roller 62.

The engine controller 140 is connected to a sensor group S1 (corresponding to a detection section in the present disclosure) to sense apparatus states. The sensor group S1 includes, for example, a cassette presence detection sensor S11 (hereinafter referred to as a cassette sensor S11), a paper remaining amount detection sensor S12 (hereinafter referred to as a paper amount sensor S12), a paper size detection sensor S13 (hereinafter referred to as a paper size sensor S13), a cover opening/closing detection sensor S14 (hereinafter referred to as a cover sensor S14), etc.

The cassette sensor S11 senses accommodation and drawing out of the cassette 31 shown in FIG. 1 relative to the apparatus main body (i.e., an apparatus state). The cassette sensor S11 is a switch of spring type or interlocking type, for example. When the cassette 31 is accommodated, a side surface of the cassette 31 presses the cassette sensor S11. When the cassette 31 is pulled out, the cassette sensor S11 is free from the pressure. Accordingly, the output of the cassette sensor S11 differs between in accommodation and in drawing out. Thus, accommodation and drawing out of the cassette 31 relative to the apparatus main body can be detected on the basis of the output from the cassette sensor S11. The engine controller 140 receives the output from the cassette sensor S11 and detects accommodation or drawing out of the cassette 31 relative to the apparatus main body.

The paper amount sensor S12 senses the amount of the paper P remaining in the cassette 31 shown in FIG. 1 (i.e., an apparatus state). The paper amount sensor S12 is an optical sensor, for example, and varies its output according to an inclination angle of the mounting plate 32 (the number of pieces of the paper P placed on the mounting plate 32). Thus, the amount of the paper P remaining in the cassette 31 can be detected on the basis of the output from the paper amount sensor S12. The engine controller 140 receives the output from the paper amount sensor S12 and detects the amount of the paper P remaining in the cassette 31.

The paper size sensor S13 senses the size of the paper P in the cassette 31 shown in FIG. 1 (i.e., an apparatus state). The paper size sensor S13 is an optical sensor, for example, and changes its output according to the position of the restriction guide 33 in the slidable direction. Thus, the size of the paper P in the cassette 31 can be detected on the basis of the output from the paper size sensor S13. The engine controller 140 receives the output from the paper size sensor S13 and detects the size of the paper P in the cassette 31.

The cover sensor S14 detects opening/closing of the apparatus cover CV (i.e., an apparatus state). The cover sensor S14 is of push switch type, for example, and varies its output according to opening/closing of the apparatus cover CV. Thus, opening/closing of the apparatus cover CV can be detected on the basis of the output from the cover sensor S14. The engine controller 140 receives the output from the cover sensor S14 and detects opening/closing of the apparatus cover CV.

The engine controller 140, which is connected to the sensor group S1, detects the apparatus states and notifies the main controller 110 of a detection result. The main controller 110 sends information indicating the apparatus states to a user terminal 200, for example. Thus, the information indicating the apparatus states can be displayed on a monitor of the user terminal 200.

The engine controller 140 is connected also to a paper feed controller 150. The paper feed controller 150 includes a CPU 151 and a memory 152. The paper feed controller 150 receives an instruction from the main controller 110 via the engine controller 140 to control a paper feeding operation of the paper feeder 108.

The paper feed controller 150 is connected to a sensor group S2 to sense states of the paper feeder 108. The sensor group S2 includes, for example, a cassette presence detection sensor S21 (hereinafter referred to as a cassette sensor S21), a paper remaining amount detection sensor S22 (hereinafter referred to as a paper amount sensor S22), and a paper size detection sensor S23 (hereinafter referred to as a paper size sensor S23), etc. These sensors S21-S23 connected to the paper feed controller 150 are the same as the sensors S11-S13 connected to the engine controller 140.

Still further, the main controller 110 is connected to a communication section 160. The communication section 160 is connected to the user terminal 200 via a network to communicate with the user terminal 200. Thus, printing can be performed on the basis of image data sent from the user terminal 200, and image data obtained by scanning can be sent to the user terminal 200.

Moreover, the main controller 110 is connected to a power source section 170. The power source section 170 is connected to a commercially available power source to generate voltage necessary for operations of various parts of the image forming apparatus 100. By operating a main switch MS, power supply to various parts of the image forming apparatus 100 is switched on/off.

(Normal Mode and Power Save Mode)

The image forming apparatus 100 has a normal mode and a power save mode in which power consumption is reduced more than in the normal mode. Specifically, the power source section 170 performs normal power supply to the respective parts of the image forming apparatus 100 in the normal mode. The main controller 110 clocks nonuse time during which the image forming apparatus 100 remains unused. When the nonuse time exceeds a predetermined time period, the main controller 110 instructs the power source section 170 to transfer from the normal mode to the power save mode. Further, when the operation panel 101 receives an instruction on transfer to the power save mode (e.g., when a power saving key provided on the operation panel 101 is pressed), the main controller 110 also instructs the power source section 170 to transfer from the normal mode to the power save mode.

When the power source section 170 transfers from the normal mode to the power save mode, the power source section 170 limits power supply to the operation panel 101, the image reading section 102, the engine section 107, and the paper feeder 108. For example, the power source section 170 suspends power supply to the motors (not shown) to rotate various rotary members, the heater 63, etc.

The image forming apparatus 100 employs a plurality of CPUs (e.g., the main CPU 111, the engine CPU 141, etc.). In the power save mode, each CUP sets its operation clock low (changes its operation clock from a normal clock to a power saving clock) to reduce power supply from the power source section 170. For example, a clock signal generation section (not shown), which supplies a clock signal to a corresponding CPU is provided in each controller (the main controller 110, the engine controller 140, etc.) of the image forming apparatus 100. Each CPU controls to the corresponding clock signal generation section to generate a normal clock in the normal mode and to generate a power saving clock in the power save mode.

Figure 3:
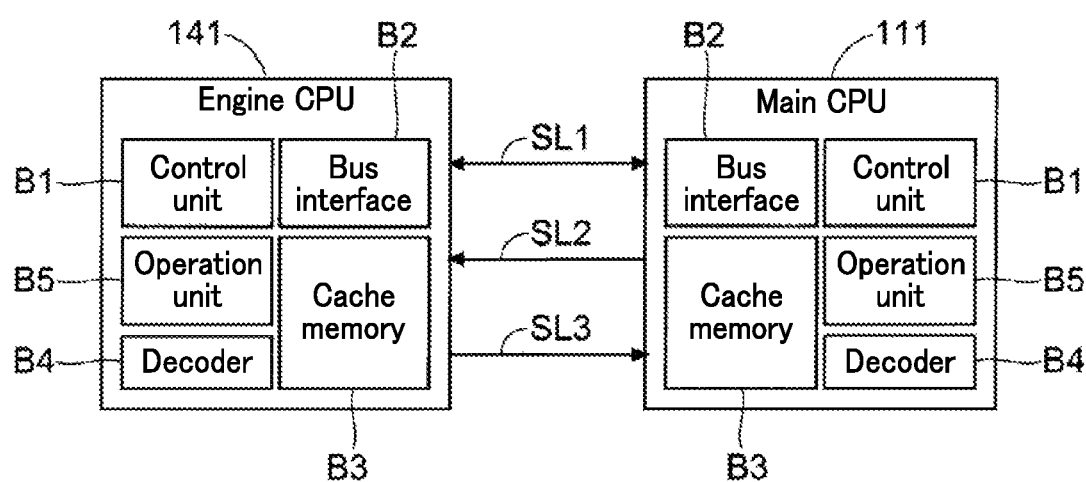
FIG. 3 is a block diagram for explaining types of signal lines connecting controllers together in the image forming apparatus shown in FIG. 1.

FIG. 3 is a block diagram for explaining types of signal lines that connects the controllers together in the image forming apparatus 100 shown in FIG. 1. The types of the signal lines for the main CPU 111 and the engine CPU 141 will be described in detail below as one example with reference to FIGS. 2 and 3.

For example, each of the main CPU 111 and the engine CPU 141 is compose of a plurality of blocks B1-B5. The block B1 denotes a control unit to manage an operation of the entirety of the corresponding CPU. The block B2 denotes a bus interface to control data for communication with the other CPUs. The block B3 denotes a cache memory to store instructions and data. The block B4 denotes a decoder to decode the content of an instruction. The block B5 denotes an operation unit to perform various operations. Further, the main CPU 111 and the engine CPU 141 are connected together by means of a signal line SL1, through which various information (information on a print job, information on apparatus states, etc.) is sent/received. Further, the main CPU 111 and the engine CPU 141 are connected together by means of a signal line SL2 and a signal line SL3 besides the signal line SL1. It is noted that signal line SL2 and the signal line SL3 will be described later in detail.

Power supply to some of the blocks B1-B5 is limited in the power save mode. For example, power supply to part of the bus interface and part of the operation unit is suspended. This results in suspension of communication functions (function of communicating information on a print job, information on apparatus states, etc.) of the main CPU 111 and the engine CPU 141. Thus, the main CPU 111 and the engine CPU 141 perform no communication through the signal line SL1 in the power save mode.

For example, when a print request (image data of an image to be formed) is sent from the user terminal 200 to the image forming apparatus 100 in the power save mode, the main CPU 111 and the engine CPU 141 are returned from the power save mode to the normal mode. Specifically, when a print request is sent from the user terminal 200 to the image forming apparatus 100 in the power save mode, the communication section 160 receives the print request. That is, the communication section 160 continues receiving power supply from the power source section 170 even in the power save mode. When the communication section 160 receives the print request in the power save mode, the main CPU 111 is returned from the power save mode to the normal mode (the operation clock of the main CPU 111 is returned from the power saving clock to the normal clock).

Thereafter, the main CPU 111 outputs to the engine CPU 141 a return request from the power save mode to the normal mod in a manner to change the level of the signal line SL2. For example, for outputting a return request to the engine CPU 141, the main CPU 111 changes the level of the signal line SL2 from low (L) to high (H) to return the engine CPU 141. Upon receipt of the return request from the main CPU 111, the engine CPU 141 is returned from the power save mode to the normal mode. Then, the engine CPU 141 allows the engine section 107 to perform the warm-up operation necessary for execution of a print job (corresponding to first processing in the present disclosure, which may be hereinafter referred merely to as first processing). The warm-up operation necessary for execution of a print job may be an operation to start power supply to the motors (not shown) to rotate various rotary members, the heater 63, etc., for example.

In addition, when the amount of remaining paper P or size of the paper P in the cassette 31 varies or the apparatus cover CV is opened in the power save mode, the main CPU 111 and the engine CPU 141 are returned from the power save mode to the normal mode. Specifically, the engine CPU 141 detects the apparatus states on the basis of the output from the sensor group S1 (cassette sensor S11, paper amount sensor S12, paper size sensor S13, and cover sensor S14) even in the power save mode. That is, the sensor group S1 continues receiving power supply from the power source section 170 even in the power save mode.

Upon detection of change in any apparatus state, the engine CPU 141 outputs to the main CPU 111 a return request from the power save mode to the normal mode in a manner to change the level of the signal line SL3. For example, the engine CPU 141 outputs a return request to the main CPU 111 in a manner to change the level of the signal line SL3 from low to high. Upon receipt of the return request from the engine CPU 141, the main CPU 111 is returned from the power save mode to the normal mode.

Thereafter, the main CPU 111 outputs to the engine CPU 141 a return request from the power save mode to the normal mode in a manner to change the level of the signal line SL2. For example, the main CPU 111 outputs the return request to the engine CPU 141 in a manner to change the level of the signal line SL2 from low to high to return the engine CPU 141. Upon receipt of the return request from the main CPU 111, the engine CPU 141 is returned from the power save mode to the normal mode. Then, the engine CPU 141 sends to the main CPU 111 information indicating the apparatus state detected on the basis of the output from the sensor group S1, that is, information on the state of the paper P accommodated (hereinafter referred to as a paper accommodation state) in the cassette 31, an open/closed state of the apparatus cover CV, etc. (corresponding to second processing in the present disclosure, which may be hereinafter referred merely to as second processing). However, the engine CPU 141 allows the engine section 107 not to perform the warm-up operation.

Upon receipt of the information indicating the apparatus state from the engine CPU 141, the main CPU 111 sends the information indicating the apparatus state to the user terminal 200 via the communication section 160. Thus, the information indicating the apparatus state can be displayed on the monitor of the user terminal 200. Thereafter, the main CPU 111 and the engine CPU 141 are returned to the power save mode.

Figure 4A:
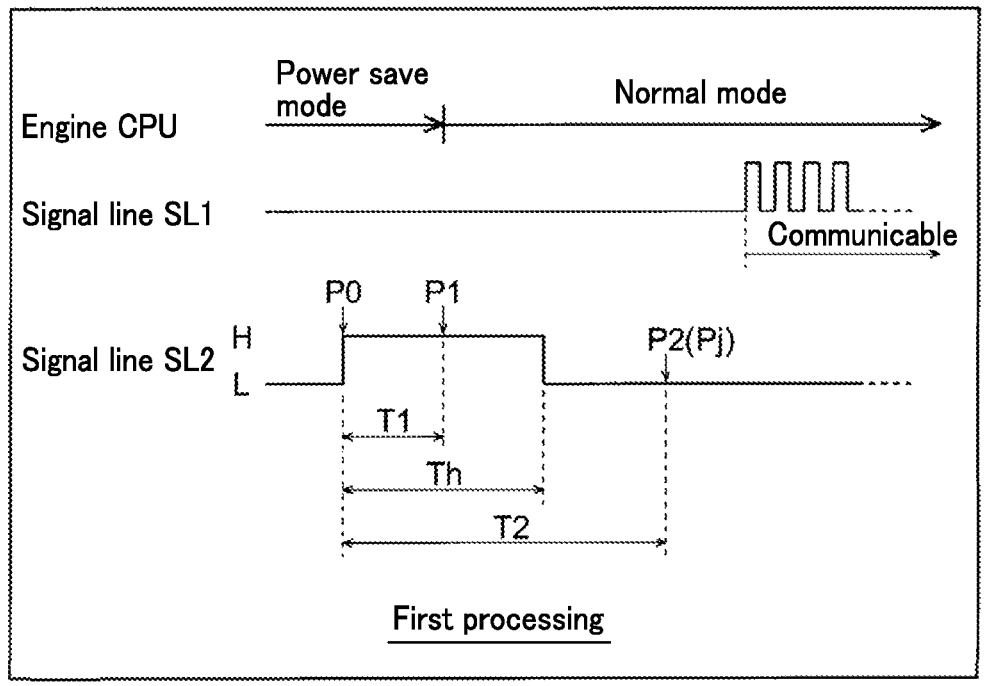
FIG. 4A is a timing chart for explaining an operation to make an engine CPU perform first processing.
Figure 4B:
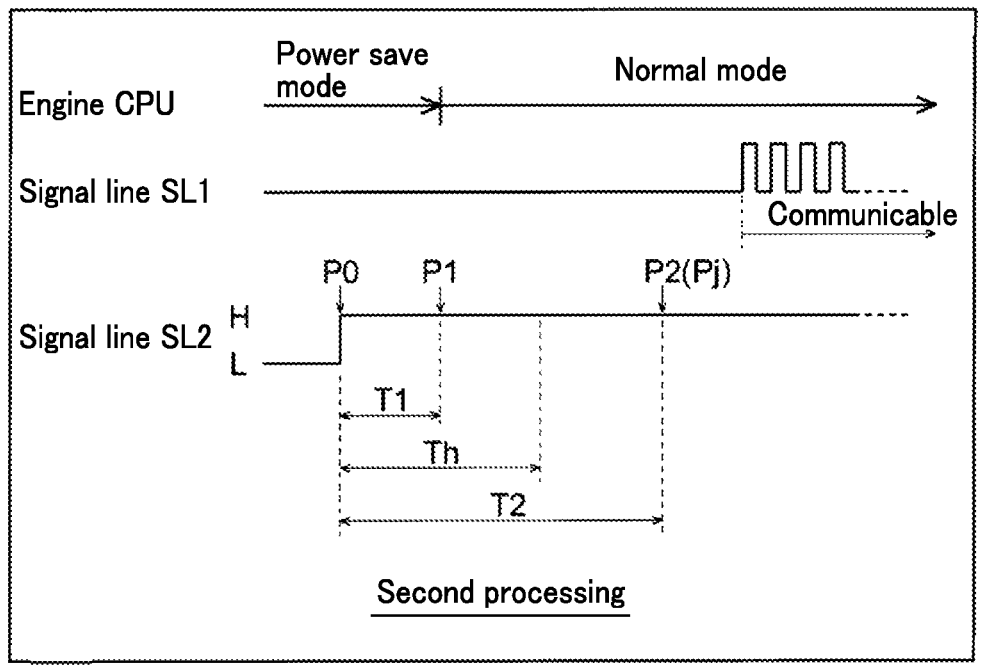
FIG. 4B is a timing chart for explaining an operation to make the engine CPU perform second processing.

FIG. 4 is a timing chart for explaining an operation in a return from the power save mode to the normal mode in the image forming apparatus 100 shown in FIG. 1. FIG. 4A is a timing chart for explaining an operation to make the engine CPU 141 perform the first processing. FIG. 4B is a timing chart for explaining an operation to make the engine CPU 141 perform the second processing. As has been described with reference to FIGS. 2 and 3, there are plural types of processing that the engine CPU 141 performs in a return in the present embodiment. As shown in FIG. 4A, in order to make the engine CPU 141 perform the first processing, the main CPU 111 changes the level of the signal line SL2 from high to low after output of a return request (after the level of the signal line SL2 is changed from low to high). By contrast, as shown in FIG. 4B, in order to make the engine CPU 141 perform the second processing, the main CPU 111 maintains the level of the signal line SL2 at the high level after output of a return request. Then, the engine CPU 141 determines on the basis of the level of the signal line SL2 after output of a return request whether to perform the first processing or the second processing.

When the main CPU 111 outputs a return request (when the level of the signal line SL2 is changed from low to high), chattering may be caused due to change in level of the signal line SL2 from low to high. Accordingly, upon detection of the high level of the signal line SL2, the engine CPU 141 removes chattering and determines then whether the return request is output from the main CPU 111. For example, the engine CPU 141 detects the level of the signal line SL2 every 2 ms. When high level of the signal line SL2 is detected five times consecutively, it is determined that the main CPU 111 outputs a return request.

Accordingly, until a predetermined time period T1 including at least a chattering removal time necessary for removal of chattering elapses after the level of the signal line SL2 is changed from low to high, the level of the signal line SL2 must be maintained at the high level. For this reason, the main CPU 111 keeps maintaining the level of the signal line SL2 at the high level at least during the time from a time point P0 when the level of the signal line SL2 is changed from low to high to a time point P1 when the predetermined period T1 elapses. In order to make the engine CPU 141 perform the first processing, the main CPU 111 changes the level of the signal line SL2 to low after the predetermined time period T1 elapses from output of the return request (FIG. 4A). By contrast, in order to make the engine CPU 141 perform the second processing, the main CPU 111 maintains the level of the signal line SL2 at the high level (FIG. 4B). In the following description, a time period in which the level of the signal line SL2 is maintained at the high level is referred to as a time period Th. It is noted that although the time period Th is longer than the predetermined period T1 in FIGS. 4A and 4B, the time period Th may be equal to the predetermined period T1.

Incidentally, when the engine CPU 141 detects change in state of the paper feeder 108 (paper accommodation state in the cassette 81) in the power save mode, the engine CPU 141 is returned from the power save mode to the normal mode and communicates with the paper feed controller 150 to obtain information indicating the state of the paper feeder 108. Alternatively, the engine CPU 141 is periodically returned from the power save mode to the normal mode and communicates with the paper feed controller 150 to obtain the information indicating the state of the paper feeder 108.

Upon change in state of the paper feeder 108, the engine CPU 141 starts switching from the power save mode to the normal mode, as described above. In this case, the engine CPU 141 cannot monitor the signal line SL2 during the time from a start of switch from the power save mode to the normal mode to a finish of initial processing accompanied by the switch from the power save mode to the normal mode (e.g., clearing a RAM region). That is, the engine CPU 141 is disabled from detecting a return request output from the main CPU 111 during switching from the power save mode to the normal mode.

For example, suppose that the engine CPU 141 starts switching from the power save mode to the normal mode before the chattering removal time elapses after the main CPU 111 outputs a return request (in the middle of chattering removal by the engine CPU 141). It is noted that at this time point, which is in the process of chattering removal performed in the power save mode, the engine CPU 141 is disabled from detecting the return request output from the main CPU 111. In this case, the engine CPU 141 restarts monitoring the signal line SL2 after the finish of the initial processing accompanied by the switch from the power save mode to the normal mode after the start of switch from the power save mode to the normal mode. Then, upon detection of high level of the signal line SL2, the engine CPU 141 removes chattering again and determines whether the main CPU 111 outputs a return request.

Accordingly, where the paper feeder 108 is additionally attached to the image forming apparatus 100, it is preferable that the predetermined time period T1 includes a switching time from the power save mode to the normal mode, a time period of the initial processing necessary for start of monitoring the signal line SL2, and a chattering removal time in the normal mode, in addition to the chattering removal time in the power save mode. It is noted that where the paper feeder 108 is not attached to the image forming apparatus 100, the predetermined time period T1 may be the chattering removal time in the power save mode.

Further, in order to make the engine CPU 141 perform the first processing after the predetermined time period T1 elapses from output of a return request and before a preparation time T2 necessary for the engine CPU 141 to perform processing in a return elapses, the main CPU 111 changes the level of the signal line SL2 from high to low (FIG. 4A). By contrast, in order to make the engine CPU 141 perform the second processing, the main CPU 111 maintains the level of the signal line SL2 at the high level (FIG. 4B).

For example, the preparation time T2 corresponds to a time period including a time period for switching from the power save mode to the normal mode, a time period for the initial processing to start monitoring the signal line SL2, and a time period for initial processing to allow the engine section 107 to start the warm-up operation. It is noted that the time period for the initial processing to allow the engine section 107 to start the warm-up operation is a time period including a time period until the thermistor 64 operates normally, a time period required for reading out of information necessary for the warm-up operation, etc.

When predetermined determination time Pj comes, the engine CPU 141 determines whether the level of the signal line SL2 is high or low. When the determination result is that the level of the signal line SL2 is low at the determination time Pj (FIG. 4A), the engine CPU 141 performs the first processing in the return. By contrast, the determination result is that the level of the signal line SL2 is high at the determination time Pj (FIG. 4B), the engine CPU 141 performs the second processing in the return. For example, the determination time Pj at which processing to be performed in a return is determined is a time point P2 when the preparation time T2 elapses. Alternatively, the determination time Pj may be a time point before the preparation time T2 elapses.

Thus, if the engine CPU 141 is instructed to perform the first processing in a return, the warm-up operation can be immediately started at the time point P2 at which preparation for the warm-up operation is already completed. However, if the apparatus cover CV is opened, the engine CPU 141 is not allowed to start the warm-up operation.

Figure 5:
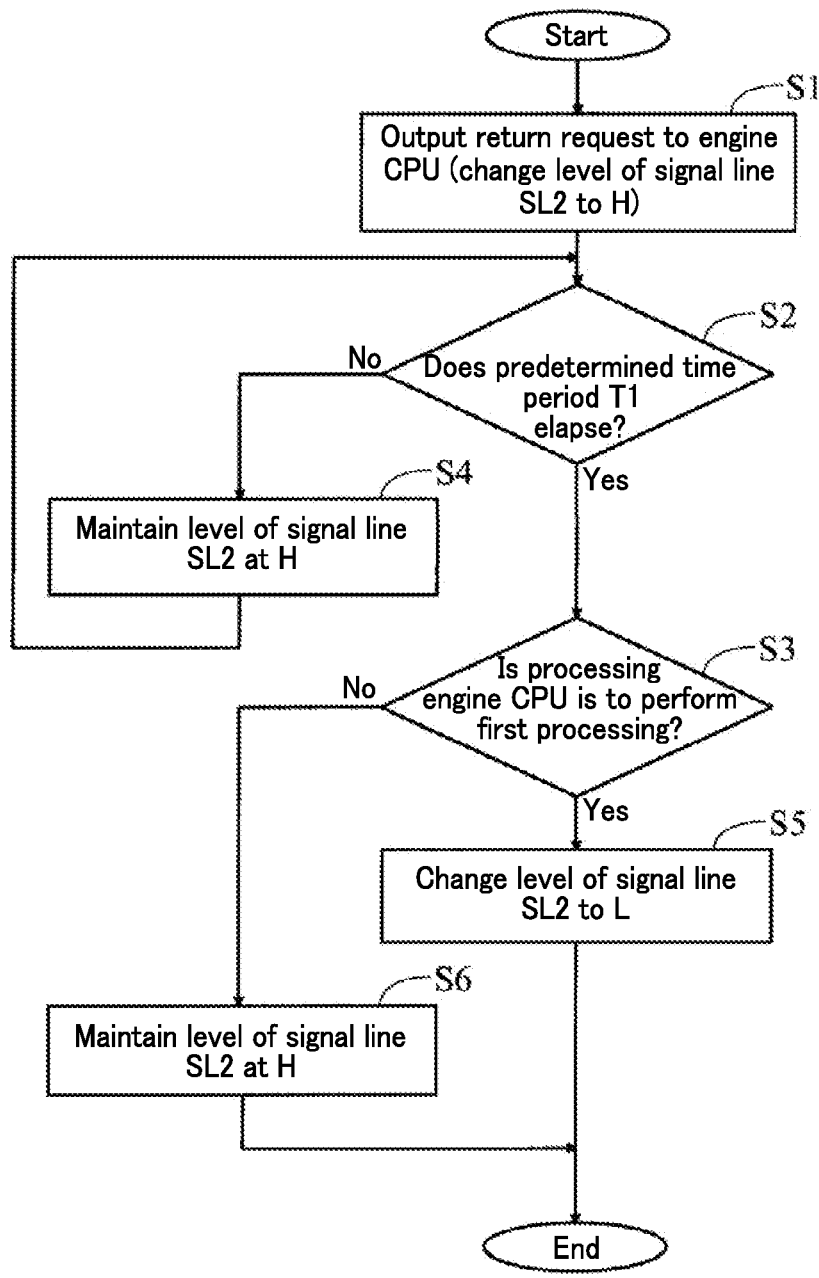
FIG. 5 is a flowchart for explaining a flow in a return from a power save mode to a normal mode in the image forming apparatus shown in FIG. 1.

FIG. 5 is a flowchart for explaining a flow of a return from the power save mode to the normal mode in the image forming apparatus 100 shown in FIG. 1. With reference to the flowchart shown in FIG. 5, an operation of the main CPU 111 in a return from the power save mode to the normal mode will be described next.

First, suppose that the mode has been transferred from the normal mode to the power save mode at the start of the flowchart in FIG. 5. When the user terminal 200 sends a print request to the image forming apparatus 100, the main CPU 111 starts the operation depicted in the flowchart of FIG. 5. Also, the main CPU 111 starts the operation depicted in the flowchart of FIG. 5 when the engine CPU 141 detects change in the apparatus state (paper accommodation state in the cassette 31, open/closed state of the apparatus cover CV, etc.) and outputs to the main CPU 111 a return request from the power save mode to the normal mode. At this time, the main CPU 111 starts switching from the power save mode to the normal mode.

The main CPU 111 outputs to the engine CPU 141 a return request from the power save mode to the normal mode in step S1. That is, the main CPU 111 changes the level of the signal line SL2 from low to high.

The main CPU 111 determines whether the predetermined time period T1 elapses in step S2. In the determination result, if the predetermined time period elapses, the process proceeds to step S3. By contrast, if the predetermined time period T1 does not elapsed yet, the process proceeds to step S4. When the process proceeds to step S4, the main CPU 111 maintains the level of the signal line SL2 at the high level. Then, the process returns to step S2.

When the process proceeds from the step S2 to step S3, the main CPU 111 determines whether processing that the engine CPU 141 is to perform is the first processing or not. In the determination result, if the processing that the engine CPU 141 is to perform is the first processing, the process proceeds to step S5. By contrast, if the processing that the engine CPU 141 is to perform is the second processing rather than the first processing, the process proceeds to step S6.

When the process proceeds to step S5, the main CPU 111 changes the level of the signal line SL2 from high to low. It should be noted that the level of the signal line SL2 is changed from high to low only after the predetermined time period T1 elapses from output of the return request and before the preparation time T2 elapses. Alternatively, when the process proceeds to step S6, the main CPU 111 maintains the level of the signal line SL2 at the high level.

Figure 6:
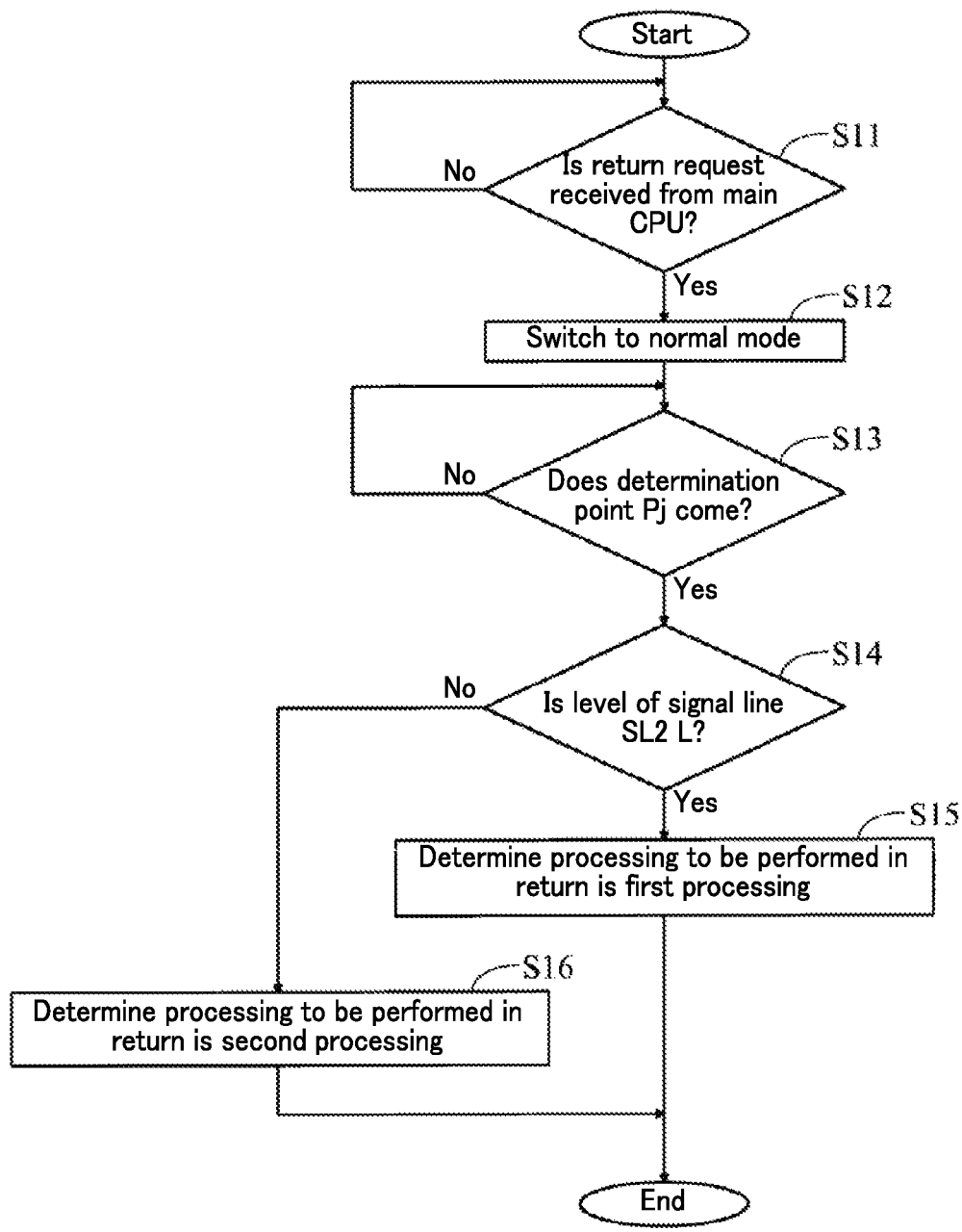
FIG. 6 is a flowchart for explaining a flow in a return from the power save mode to the normal mode in the image forming apparatus shown in FIG. 1.

FIG. 6 is a flowchart for explaining a flow of a return from the power save mode to the normal mode in the image forming apparatus 100 shown in FIG. 1. With reference to the flowchart shown in FIG. 6, description will be made next about an operation of the engine CPU 141 in a return from the power save mode to the normal mode. It is noted that the start point of the flowchart in FIG. 6 is the same as that of the flowchart in FIG. 5

The engine CPU 141 determines whether a return request from the main CPU 111 is received in step S11. That is, the engine CPU 141 determines whether the level of the signal line SL2 is changed from low to high. At this time, the engine CPU 141 removes chattering until the predetermined time period T1 elapses and determines whether a return request from the main CPU 111 is received. If it is determined that the return request from the main CPU 111 is received, the process proceeds to step S12. If it is determined that the return request from the main CPU 111 is not received yet, the process returns to the start point.

When the process proceeds to step S12, the engine CPU 141 starts switching from the power save mode to the normal mode. It is noted that the initial processing to start monitoring the signal line SL2, the initial processing to allow the engine section 107 to start the warm-up operation, etc. also start sequentially. Each of the processing finishes before the preparation time T2 elapses.

The engine CPU 141 determines whether the determination point Pj, at which processing to be performed in the return is determined (e.g., time point P2 when the preparation time T2 elapses), comes in step S13. If the determination results in that the determination point Pj comes, the process proceeds to step S14. If it results in that the determination point Pj does not come yet, the determination in step S13 is repeated.

When the process proceeds to step S14, the engine CPU 141 determines whether the level of the signal line SL2 is low or not. If the determination results in that the level of the signal line SL2 is low, the process proceeds to step S15. By contrast, if it results in that the level of the signal line SL2 is high rather than low, the process proceeds to step S16.

If the process proceeds to step S15, the engine CPU 141 determines that processing to be performed in the return is the first processing. That is, the engine CPU 141 allows the engine section 107 to perform the warm-up operation (power supply to the heater 63 and the like) in the return. By contrast, if the process proceeds to step S16, the engine CPU 141 determines that processing to be performed in the return is the second processing. That is, the engine CPU 141 allows the engine section 107 not to perform the warm-up operation in the return and sends information indicating the apparatus states (paper accommodation state in the cassette 31, open/closed state of the apparatus cover CV, etc.) to the main CPU 111.

As described above, the image forming apparatus 100 according to the present embodiment includes the engine CPU 141 (slave controller) configured to perform the first processing or the second processing different form the first processing in a return from the power save mode to the normal mode and the main CPU 111 (master controller) configured to return the engine CPU 141 from the power save mode to the normal mode. The main CPU 111 is connected to the engine CPU 141 through the signal line SL2. The main CPU 111 outputs to the engine CPU 141 a return request from the power save mode to the normal mode in a manner to change the level of the signal line SL2 from low to high. Subsequently, in order to make the engine CPU to perform the first processing, the main CPU 111 changes the level of the signal line SL2 to low (first level) after the output of the return request. By contrast, in order to make the engine CPU perform the second processing, the main CPU 111 maintains the level of the signal line SL2 at the high level (second level) after the output of the return request. The engine CPU 141 determines, on the basis of the level of the signal line SL2 after the output of the return request, which processing is to be performed, the first processing or the second processing.

That is, the main CPU 111 outputs to the engine CPU 141 a return request from the power save mode to the normal mode in a manner to change the level of the signal line SL2 connected to the engine CPU 141 in the present embodiment. Subsequently, the main CPU 111 changes the level of the same signal line SL2 to low or high (or maintains the high level) to provide to the engine CPU 141 an instruction as to which processing is to perform in the return, the first processing or the second processing. Accordingly, it is unnecessary to provide a signal line to output to the engine CPU 141 an instruction of processing to be performed in a return besides the signal line SL2 to output a return request to the engine CPU 141. This can reduce the number of signal lines connecting the main CPU 111 to the engine CPU 141, thereby simplifying the circuit configuration, which may result in cost reduction.

Further, in the present embodiment, after the main CPU 111 outputs a return request to the engine CPU 141, the main CPU 111 only changes (or maintains) the level of the signal line SL2 after output of the return request. This simple operation can provide to the engine CPU 141 an instruction of the processing to be performed in the return. Accordingly, the main CPU 111 and the engine CPU 141 are not required to be communicable during the time when an instruction of the processing to be performed in a return is provided to the engine CPU 141. Thus, even before the main CPU 111 and the engine CPU 141 are communicable after output of a return request, the engine CPU 141 can recognize that the processing to perform in the return is the first processing or the second processing. This can allow the processing to be performed in the return to start early.

Moreover, in the present embodiment, as described above, after the predetermined time period T1 elapses from output of a return request, the main CPU 111 changes the level of the signal line SL2 to low or high. The engine CPU 141 determines which processing is to perform, the first processing or the second processing, on the basis of the level of the signal line SL2. It is noted that the predetermined time period T1 includes at least the chattering removal time necessary for removal of chattering which may be caused in change in level of the signal line SL2. In the present embodiment, the main CPU 111 maintains the level of the signal line SL2 at the high level during the time when the engine CPU 141 removes chattering. That is, the main CPU 111 does not change the level of the signal line SL2 from high to low until the predetermined time period T1 elapses even when the engine CPU 141 is to perform the first processing. This can allow the engine CPU 141 to remove chattering successfully.

Furthermore, in the present embodiment, as described above, the main CPU 111 sets the level of the signal line SL2 at low or high level after the predetermined time period T1 elapses from a return request and before the preparation time T2 necessary for making the engine CPU 141 perform processing in a return elapses. Accordingly, the engine CPU 141 can recognize processing to perform in the return before the preparation time T2 elapses. Thus, processing to be performed in a return can start early.

Yet further, as described above, the image forming apparatus 100 in the present embodiment includes the engine section 107 (printing section) that executes a print job. In addition, the image forming apparatus 100 includes the sensor group S1 (detection section) to sense the apparatus states. When the engine CPU 141 receives an instruction to perform one of the first processing and the second processing (the first processing in the present embodiment) from the main CPU 111, the engine CPU 141 allows the engine section 107 to perform the warm-up operation necessary for execution of the print job. By contrast, when the engine CPU 141 receives an instruction to perform the other of the first processing and the second processing (the second processing in the present embodiment) from the main CPU 111, the engine CPU 141 allows the engine section 107 not to perform the warm-up operation and notifies the main CPU 111 of information indicating the apparatus states detected on the basis of the output from the sensor group S1.

The embodiment of the present disclosure is a mere example in all the respects and should not be taken as limitation. The scope of the present disclosure is defined by the claims rather than the above embodiment and encompasses any equivalents to the claims and modifications within the scope of the claims.

What is claimed is:

1. An image forming apparatus having a normal mode and a power save mode in which power consumption is reduced more than in the normal mode, comprising:
    a slave controller configured to perform first processing or second processing different from the first processing in a return from the power save mode to the normal mode; and
    a master controller configured to return the slave controller from the power save mode to the normal mode,
    wherein the master controller is connected to the slave controller through a signal line and outputs to the slave controller a return request from the power save mode to the normal mode in a manner to change a level of the signal line,
    in order to make the slave controller perform the first processing after an output of the return request, the master controller sets the level of the signal line at a predetermined first level, and in order to make the slave controller perform the second processing after the output of the return request, the master controller sets the level of the signal line at a predetermined second level,
    the slave controller determines, on based on the level of the signal line after the output of the return request, which processing is to perform, the first processing or the second processing, the master controller sets the level of the signal line at the first level or the second level after a predetermined time period elapses from the output of the return request, the slave controller determines, on based on the level of the signal line after the predetermined time period elapses from the output of the return request, which processing is to perform, the first processing or the second processing, the predetermined time period includes a chattering removal time necessary for removal of chattering caused in change in the level of the signal line, a time period in which the slave controller switches from the power save mode to the normal mode, and a time period required for initial processing to start monitoring the level of the signal line.

2. The image forming apparatus according to claim 1, wherein the master controller sets the level of the signal line at the first level or the second level after the predetermined time period elapses from the output of the return request and before a preparation time necessary for the slave controller to perform the first processing or the second processing in the return elapses.

3. The image forming apparatus according to claim 1, further comprising:

a printing section configured to execute a print job, wherein when the slave controller receives an instruction to perform one of the first processing and the second processing from the master controller, the slave controller allows the printing section to perform a warm-up operation necessary for execution of the print job.

4. The image forming apparatus according to claim 3, further comprising:

a detection section connected to the slave controller and configured to sense a state of the image forming apparatus, wherein when the slave controller receives an instruction to perform another of the first processing and the second processing from the master controller, the slave controller allows the printing section not to perform the warm-up operation and notifies the master controller of information indicating the state of the image forming apparatus detected based on an output from the detection section.

5. An image forming apparatus having a normal mode and a power save mode in which power consumption is reduced more than in the normal mode, comprising:

a slave controller configured to perform first processing or second processing different from the first processing in a return from the power save mode to the normal mode;

a master controller configured to return the slave controller from the power save mode to the normal mode;

a printing section configured to execute a print job; and a detection section connected to the slave controller and configured to sense a state of the image forming apparatus, wherein the master controller is connected to the slave controller through a signal line and outputs to the slave controller a return request from the power save mode to the normal mode in a manner to change a level of the signal line, in order to make the slave controller perform the first processing after an output of the return request, the master controller sets the level of the signal line at a predetermined first level, and in order to make the slave controller perform the second processing after the output of the return request, the master controller sets the level of the signal line at a predetermined second level, the slave controller determines, based on the level of the signal line after the output of the return request, which processing is to perform, the first processing or the second processing, when the slave controller receives an instruction to perform another of the first processing and the second processing from the master controller, the slave controller allows the printing section to perform a warm-up operation necessary for execution of the print job, and when the slave controller receives an instruction to perform another of the first processing and the second processing from the master controller, the slave controller allows the printing section not to perform the warm-up operation and notifies the master controller of information indicating the state of the image forming apparatus detected based on an output from the detection section.

6. The image forming apparatus according to claim 5, wherein the master controller sets the level of the signal line at the first level or the second level after a predetermined time period elapses from the output of the return request, and the slave controller determines, based on the level of the signal line after the predetermined time period elapses from the output of the return request, which processing is to perform, the first processing or the second processing.

7. The image forming apparatus according to claim 6, wherein the predetermined time period includes at least a chattering removal time necessary for removal of chattering caused in change in the level of the signal line.

8. The image forming apparatus according to claim 7, wherein the predetermined time period further includes a time period in which the slave controller switches from the power save mode to the normal mode and a time period required for initial processing to start monitoring the level of the signal line.

9. The image forming apparatus according to claim 6, wherein the master controller sets the level of the signal line at the first level or the second level after the predetermined time period elapses from the output of the return request and before a preparation time necessary for the slave controller to perform the first processing or the second processing in the return elapses.

* * * * *